United States Patent [19]

Jones

[11] 4,429,704

[45] Feb. 7, 1984

[54] SHOCK RESPONSIVE ROTARY ACTUATOR

[76] Inventor: Mitchel R. Jones, 1214 Pontenova, Hacienda Heights, Calif. 91745

[21] Appl. No.: 323,755

[22] Filed: Nov. 23, 1981

[51] Int. Cl.³ .......................................... F16K 17/36
[52] U.S. Cl. .................................... 137/45; 251/66; 251/76
[58] Field of Search ............... 137/38, 39, 45; 251/66, 251/74, 76

[56] References Cited

U.S. PATENT DOCUMENTS

| | | | |
|---|---|---|---|
| 1,742,685 | 1/1930 | Brandon | 137/38 |
| 3,466,005 | 9/1969 | Kleeberg | 251/76 X |
| 3,791,396 | 2/1974 | Nelson | 137/38 |
| 4,161,183 | 7/1979 | Berry | 137/39 |
| 4,261,379 | 4/1981 | Berry | 137/39 |

Primary Examiner—Robert G. Nilson
Attorney, Agent, or Firm—William P. Green

[57] ABSTRACT

A device for turning a valve stem or the like between two positions in response to earthquake forces or other shock forces, and including a member which is spring urged rotatively in a predetermined direction relative to a body structure and which has a lost motion connection with the valve stem or other element to be turned in order to enable initial movement of the member by the spring to develop momentum before applying force to the stem, a latch element releasably retaining the member against spring induced movement, and inertia actuated weight means responsive to shock forces to release the latch element and permit movement of the member to turn the valve stem.

16 Claims, 6 Drawing Figures

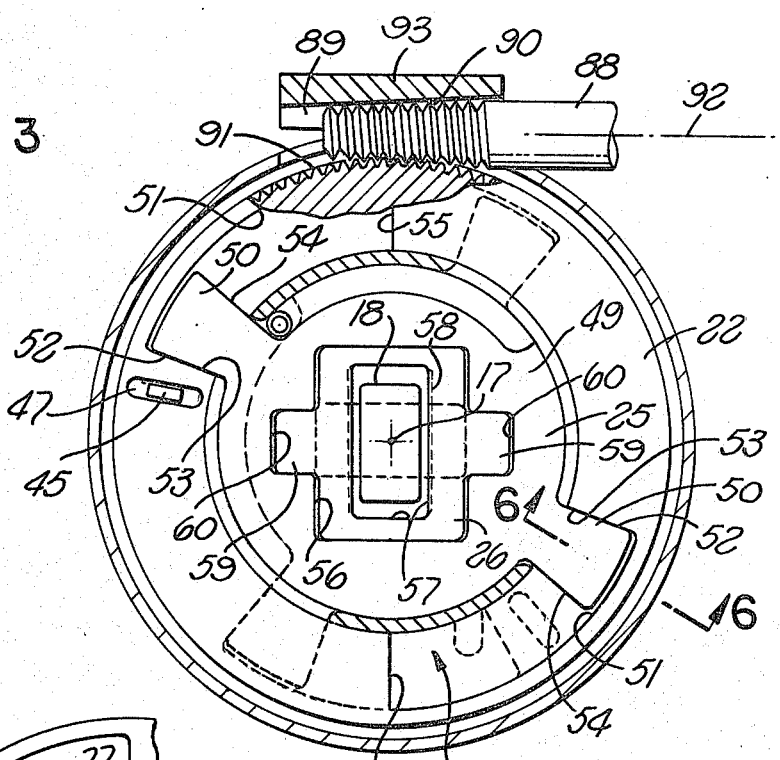
FIG. 3
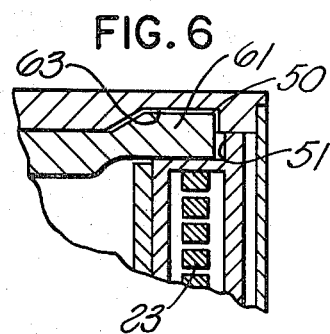
FIG. 6
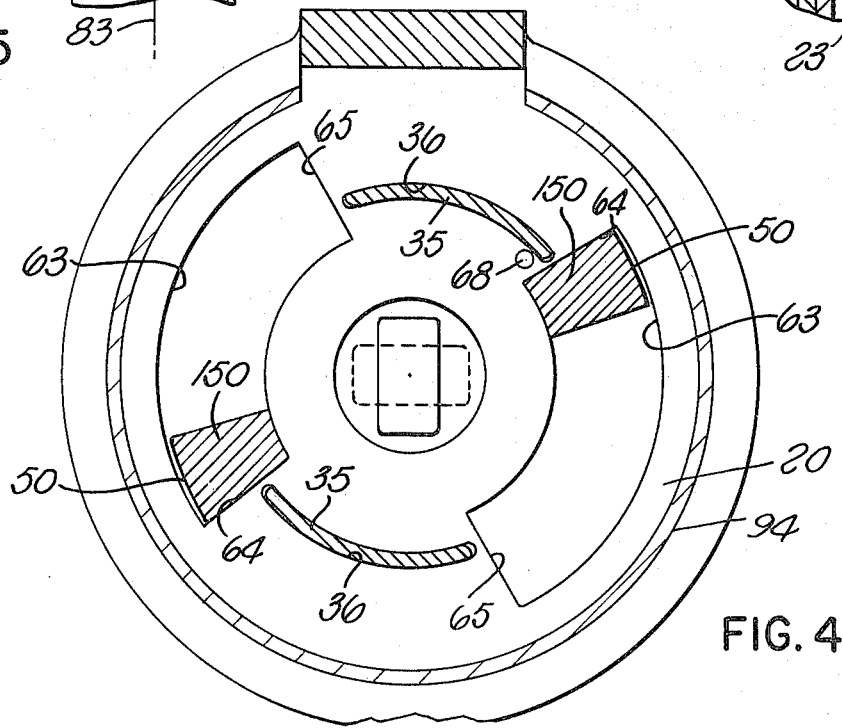
FIG. 5
FIG. 4

SHOCK RESPONSIVE ROTARY ACTUATOR

BACKGROUND OF THE INVENTION

This invention relates to improved rotary actuators for turning a valve stem or other controlled element about an axis in response to earthquake forces or other shock forces.

Various types of actuators have been provided in the past for automatically closing a gas valve, or automatically actuating another controlled part, in the event of an earthquake. These devices typically include a weight which is displaceable by inertia effects relative to a carrier body or other part when the device is subjected to shock forces, and which acts to induce movement of an actuated element in response to displacement of the weight. Most of the devices of this type with which I am familiar have been designed to control a valve element having linear movement between open and closed conditions, though some have been capable of actuating a valve rotatively. In many instances, the devices have been of such construction as to function effectively with and require use of a specially constructed nonconventional valve, thus limiting greatly the possible field of application of the device.

SUMMARY OF THE INVENTION

The present invention provides a unique actuator which can be adapted for connection to a completely conventional rotary gas valve or other similar rotary part, and which can function in response to earthquake forces or the like to positively and effectively turn the controlled element through a predetermined angle of preferably 90° in a manner closing off the flow of gas through the valve or attaining another similar desired result. An actuator embodying the invention is capable of developing a substantial force and applying that force to the actuated rotary element, to overcome any resistance which may be encountered as a result of corrosion or other conditions tending to cause sticking of the part being turned. The unit is very straightforward and reliable in its operation, and can respond to shock forces of a predetermined magnitude without danger of unintentional actuation by weaker forces which may be encountered in normal use. The interrelationship between the various parts of the device is such as to produce an extremely compact overall structure capable of fitting within a small space and presenting a neat external appearance.

Structurally, a device embodying the invention includes a body structure, a member mounted for rotary movement in opposite directions relative to the body structure, and a spring yieldingly urging the member in a first rotary direction to close the valve. Rotary motion is transmitted from the member to the valve stem or other controlled element through a lost motion connection which transmits rotary movement between the parts but allows some rotary movement of the member relative to the valve stem, with that relative motion being utilized to develop initial momentum of the member in a closing direction assuring application of adequate torque to the valve stem to overcome any stuck condition. The rotary member is retained against turning movement in the valve closing direction by latch means, which are releasable automatically by displacement of an inertia actuated weight responsive to earthquake or other shock forces. The weight may take the form of a pendulum, which is preferably carried movably by the latch element. In the preferred arrangement, the weight and latch element are both desirably contained within the interior of the body structure, the rotary member, and the spring.

BRIEF DESCRIPTION OF THE DRAWINGS

The above and other features and objects of the invention will be better understood from the following detailed description of the typical embodiment illustrated in the accompanying drawings, in which:

FIGS. 3 and 4 are transverse sections taken on lines 3—3 and 4—4 respectively of FIG. 1;

FIG. 5 is a fragmentary transverse section taken on line 5—5 of FIG. 1, with the upper portion of the pendulum shown broken away to reveal the mounting recess therein; and FIG. 6 is a fragmentary section taken on line 6—6 of FIG. 3.

DESCRIPTION OF THE PREFERRED EMBODIMENT

Figure 1:
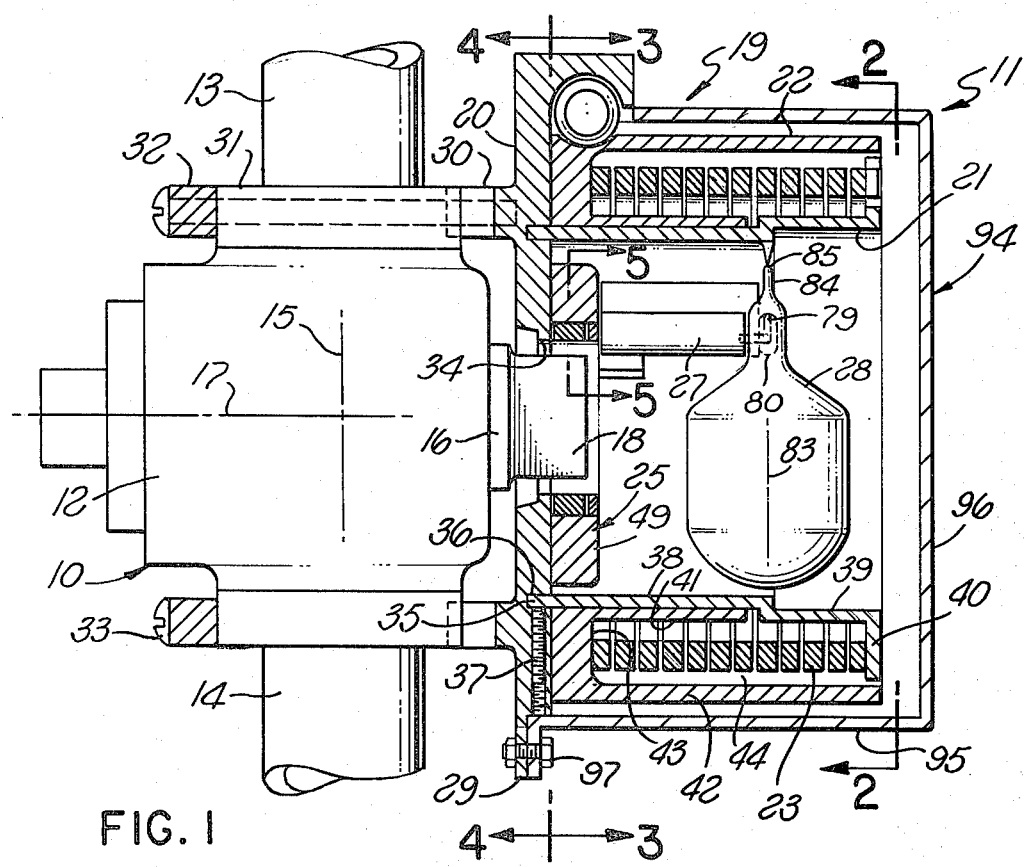
FIG. 1 is a vertical axial section through an actuator constructed in accordance with the invention, shown in combination with a conventional 90° rotary gas shut-off valve.

Referring first to FIG. 1, there is illustrated at 10 a conventional gas shut-off valve, shown in conjunction with a shock responsive automatic shut-off actuator 11 operable to close the valve in response to earthquake forces or other shock forces of a predetermined magnitude. The valve 10 includes a body 12 connected to inlet and outlet lines 13 and 14 extending along a vertical axis 15 and containing a rotary valve element 16 mounted to turn through 90° about a horizontal axis 17 between a closed position preventing gas flow through the valve body and an open position permitting such flow. The actuating stem 18 of the valve is normally of somewhat elongated rectangular cross section transversely of axis 17 (see FIG. 4), and in accordance with conventional practice extends essentially transversely of axis 15 in the closed condition of the valve and longitudinally of that axis in the open condition of the valve.

The automatic actuator 11 includes a stationary body structure 19 preferably formed of a backing plate 20, a tubular part 21, and an outer housing 94. A member 22 is mounted for rotation relative to body structure 19 about axis 17, and is yieldingly urged by a torsion coil spring 23 in a valve closing clockwise direction as viewed in FIG. 2. Member 22 actuates valve stem 18 rotatively through a lost motion connection 24 (FIG. 3), including two elements 25 and 26, and is retained against valve closing movement by a latch part 27 controlled by an inertia operated pendulum or weight member 28.

Backing plate 20 of the body structure 19 forms essentially a disc disposed transversely of axis 17 and having a peripheral edge 29 extending circularly about that axis. This backing plate 20 is connected rigidly to body 12 of the valve, as by provision of two lugs 30 formed integrally with and projecting leftwardly from plate 20 as viewed in FIG. 1 and forming saddle elements containing recesses within which the usual externally noncircular portions 31 of valve body 12 are received in closely confined relation. Two similarly shaped clamping parts 32 contain recesses embracing the opposite sides of the noncircular portions 31 of the valve body, and are attached to lugs 30 by screws 33 in a manner tightly clamping the valve body between plate 20 and parts 32 and thus securing part 20 in rigidly fixed position relative to the valve body. Backing plate 20 contains a central typically circular opening 34 through which the rectangular valve stem 18 extends and within which the valve stem may be turned.

The tubular second part 21 of body structure 19 is rigidly connected at its left end as viewed in FIG. 1 to backing plate 20, as by extension of two diametrically opposed arcuate projections 35 into correspondingly shaped arcuate grooves 36 formed in plate 20, withh these projections 35 and grooves 36 being centered and curving about axis 17. Set screws 37 threadedly connected into radial bores in part 20 are tightenable against projections 35 to effectively lock the parts 20 and 21 rigidly together in the illustrated relation, or parts 20 and 21 may be interconnected in any other convenient manner.

To the right of plate 20 as seen in FIG. 1, tubular part 21 has a first portion 38 which is internally and externally cylindrical about axis 17, and a second portion 39 which is also internally and externally cylindrical about axis 17 but at a diameter slightly greater than the portion 38. A transverse annular flange 40 of part 21 extends radially outwardly at the extremity of portion 39.

The outer housing part 94 has a cylindrical wall 95 centered about axis 17 and a transverse end wall 96, and acts to enclose the working parts of the device. This housing may be removably secured to member 20 in any convenient manner, as by screws represented at 97 in FIG. 1.

Member 22 has an inner cylindrical wall 41 which is received about portion 38 of part 21 in closely fitting relation to mount member 22 for rotation relative to part 21 about axis 17. Spaced radially outwardly from wall 41 the member 22 has a second internally and externally cylindrical wall 42 concentric with wall 41 about axis 17, and connected to wall 41 by an essentially annular end wall 43 disposed transversely of axis 17. Coil spring 23 is received within the annular compartment 44 formed between the two parts 21 and 22, and has axially turned portions 45 and 46 at its opposite ends extending into openings 47 and 48 in end wall 43 of member 22 and flange 40 of member 21 respectively. This torsion spring 23 yieldingly urges member 22 rotatively in a clockwise direction as viewed in FIG. 2 relative to body parts 20 and 21 and from the latched or cocked position of FIG. 2 to a position in which the valve element 16 is closed. The range of rotary movement of member 22 between these extreme positions is somewhat greater than the range of rotary movement of valve element 16 between its open and closed positions. For example, where valve stem 18 turns only through 90° from the full line open valve position of FIG. 4 to the broken line closed valve position of that figure, member 22 may turn through 170° between its extreme positions. Spring 23 exerts yielding force in a clockwise direction (FIG. 2) throughout this full range of movement of member 22 between its extreme positions, and even in the closed valve condition still exerts clockwise force against member 22. Member 22 is cocked in a counterclockwise direction as viewed in FIG. 2 by a manual rotation of a key 88 (FIG. 3) which is removably insertable along an axis 92 into a socket recess 89 formed in an upwardly projecting top portion 93 of body part 20. The key has a worm portion 90 which engages worm gear teeth 91 formed on the periphery of member 22 to turn member 22 in a clockwise direction as viewed in FIG. 3 (counterclockwise in FIG. 2) against the tendency of spring 23 when the key is manually rotated about axis 92. The wall 94 of socket recess 89 against which the key is engageable upwardly is smooth to allow the desired rotation of the key while holding the key in engagement with gear teeth 91.

Element 25 which has a lost motion connection with member 22 has a main externally essentially circular portion 49 from which two ears 50 project radially outwardly in diametrically opposite directions. These ears 50 are received within two arcuate recesses 51 formed in the left face of wall 43 of member 22 as viewed in FIG. 1, enabling movement of member 22 pivotally about axis 17 relative to ears 50 and the remainder of element 25 between the position of FIG. 3 in which first sides 52 of ears 50 engage shoulders 53 formed at first ends of recesses 51, and positions in which second side faces 54 of the ears engage shoulders 55 forming second ends of recesses 51. When ears 50 are in engagement with shoulders 53 (FIG. 3), any rotary motion of member 22 in a clockwise direction as viewed in FIG. 3 will cause corresponding clockwise motion of element 25. Similarly, when ears 50 are in engagement with shoulders 55, any counterclockwise motion of member 22 as viewed in FIG. 3 will cause corresponding counterclockwise motion of element 25.

At its center, element 25 contains a recess 56 of the configuration illustrated in FIG. 3 within which element 26 is carried in a relation transmitting rotary motion about axis 17 from part 25 to element 26 while permitting very slight shifting movement of element 26 relative to element 25 to allow for any slight misalignment of the parts with respect to valve stem 18. The valve stem is received within a rectangular opening 57 in element 26, dimensioned to closely receive the valve stem, with the latter also projecting into a similar but slightly larger rectangular opening 58 formed in element 25 beyond element 26. Element 26 may be externally essentially rectangular as illustrated, except for the provision of two lugs or extensions 59 projecting in diametrically opposite directions with respect to axis 17 and received within similarly shaped portions 60 of the otherwise rectangular recess 56. The external dimensions of element 26 in a left to right direction as viewed in FIG. 3 may be slightly less than the corresponding dimensions of recess 56 to enable slight shifting movement of element 26 within recess 56 in that left to right direction for alignment purposes as discussed. The vertical dimension of element 26 as viewed in FIG. 3 may be essentially the same as the vertical dimension of the recess 56, to prevent substantial shifting movement of element 26 in an upward or downward direction relative to element 25.

The rotary motion of elements 25 and 26 about axis 17 relative to body structure 19 is limited to 90° by engagement of ears 50 on element 25 with shoulders on the body structure. For this purpose, lugs 50 may have rearwardly projecting portions 61 (FIGS. 4 and 6) extending into grooves or recesses 63 formed in the right side of body member 20 as viewed in FIG. 1 and extending arcuately about axis 17, with the ears being engageable with ends 64 and 65 of grooves 63 to limit the relative motion between the parts to the discussed 90°.

Latch element 27 acts to releasably retain member 22 in the position represented in full lines in FIGS. 1 through 6 relative to the body structure 19. The latch element is carried by body structure 19 and mounted for pivotal movement relative thereto about an axis 66 (FIG. 5) which is parallel to main axis 17 of the device and the controlled valve. Such mounting of the latch element is effected by providing the latch element with aligned oppositely projecting pivot pin portions 67 and 68 received and journalled within aligned circular openings formed in a bearing lug portion 69 of body member 21 and in the second body member 20 respectively. Lug 69 is formed in the tubular member 21 at a location intermediate its front and rear ends, and at essentially the juncture of the two portions 38 and 39 of member 21. The latch element has a hook portion 70 which extends through an opening 71 in portion 38 of member 21, at a location near rear body part 20, and which in the cocked open valve condition of the actuator projects into a latching notch 72 formed in the rear portion of member 22, in a relation holding that member against clockwise rotary movement as viewed in FIG. 2. Hook portion 70 of latch element 27 has a shoulder 73 which extends generally tangentially with respect to pivotal axis 66, and which is engageable with a shoulder 74 formed on member 22 and defining a side of notch 72 and also disposed generally tangentially with respect to axis 66. Preferably, the two shoulders 73 and 74 are not disposed directly tangentially with respect to axis 66, but rather are at a slight angle to a true tangent in a manner causing clockwise torque applied to member 22 as viewed in FIGS. 2 and 5 to tend to pivot latch element 27 about axis 66 in a releasing direction. This feature is represented in FIG. 5, in which the circle 75 is centered about pivotal axis 66 and extends through the engaging shoulders 73 and 74 in the latched condition of part 27. The line 76 represents a true tangent to the circle 75 at the location of the engaging shoulders. The shoulders are disposed at a slight angle a with respect to tangent 76, preferably approximately 18°, and for most effective engagement of the shoulders they are desirably crowned to attain an even Hertz stress on the shoulder surfaces and to guarantee proper contact angle after allowing for the latch stopping position tolerances. The direction in which the shoulder surfaces are offset through the angle a from the true tangent condition represented at 76 is such that the torque forces exerted by shoulder 74 against shoulder 73 of the latch element in the cocked and latched condition of the parts (full lines in FIG. 5), have a component tending to cam the latch element 27 pivotally in a counterclockwise direction as viewed in FIG. 5, and radially inwardly away from its engagement with shoulder 74, to free member 22 for clockwise movement under the influence of spring 23. The angle a is sufficiently greater than the angle of repose of shoulders 73 and 74, as determined by the coefficient of friction of the particular material of which those shoulders are formed, that the spring force always produces enough of an unlatching component on element 27 to overcome the friction between shoulder 73 and 74 and release the latch part if such movement is permitted by pendulum 28. Preferably, shoulders 73 and 74 are formed of zinc, and the angularity of the shoulders with respect to a true tangent is the mentioned approximately 18°, resulting in application of an approximately five pound unlatching force on the latch element.

Figure 2:
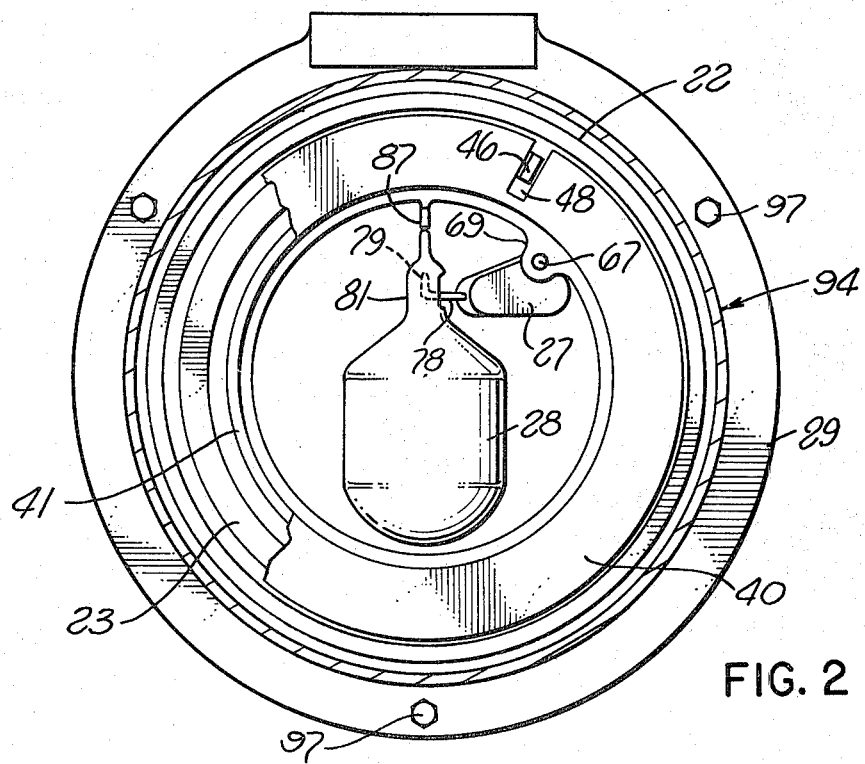
FIG. 2 is an end elevational view taken on line 2—2 of FIG. 1.

Pendulum 28 is supported by latch part 27, and is mounted for limited universal pivotal movement relative thereto, by engagement of the pendulum with a mounting pin 78 which is carried rigidly by the latch part and projects leftwardly therefrom as viewed in FIG. 2, and then upwardly to an essentially pointed end 79. Pin 78 projects into a recess 80 formed in an upper reduced diameter portion of the pendulum, and engages upwardly against a concave downwardly facing bearing surface formed at the top of the recess 80 and through which the vertical axis 83 of the pendulum extends. The pendulum thus normally tends to assume a directly vertical position along axis 83. At its upper end, the pendulum has an upwardly projecting reduced diameter vertical pin portion 84 whose upper end is engageable upwardly at 85 with the lower end of a second pin 87 rigidly secured to and projecting downwardly from member 21. The upper end surface of the pendulum at 85 is preferably slightly rounded, and the engaging downwardly facing bottom end surface of pin 87 is preferably planar and disposed horizontally. When the upper end of the pendulum is in engagement with the undersurface of body carried pin 87, this engagement prevents upward movement of the pendulum and corresponding pivotal movement of latch part 27 about its axis 66 (counterclockwise pivotal movement in FIG. 5), and thereby retains the latch in its holding position of engagement with shoulder 74 on member 22.

To now describe a cycle of use of the actuator, assume that the device has been attached to valve 10 as illustrated, and that the valve is initially in its closed position in which stem 18 extends horizontally (broken lines in FIG. 3). In that condition, member 22 is urged by spring 23 in a clockwise direction as viewed in FIG. 2 relative to the body structure 19 and to a position in which ears 50 of lost motion connector element 25 are in their broken line position of FIG. 3, and the arcuate grooves 51 containing those ears are in their broken line position of FIG. 3. Further rotation of member 22 relative to the body structure in a valve opening direction is prevented by engagement of ears 50 with shoulders 55 on member 22 and by engagement of portions 150 of ears 50 with shoulders 65 on body part 20 (FIG. 4). When it is desired to open the valve and set the actuator, key 88 is inserted into socket 89 in body part 20, so that the worm portion 90 of the key engages worm gear teeth 91 formed on the periphery of member 22, after which the key is turned to progressively rotate member 22 in a counterclockwise direction as viewed in FIG. 2 relative to body structure 19 to cock the actuator. The first portion of this rotary motion does not result in any action against the valve itself, but merely turns member 22 relative to elements 25 and 26 through the limits of the permitted lost motion therebetween. That is, member 22 rotates through the angle permitted by ears 50 of member 25 and the arcuate recesses 51 within which they are received, and until shoulders 53 move into engagement with ears 50. Further rotary movement of member 22 beyond that position results in rotation of element 25 with member 22 by virtue of the engagement of the ears with shoulders 53. This rotation causes valve stem 18 to turn through 90° to the full line position of FIG. 3, in which position latching shoulder 74 on member 22 is located for engagement with latch part 27. The latch part is then pivoted into such engagement with shoulder 74, with resultant slight lowering movement of pendulum 28, so that the upper pin portion 84 of the pendulum can be moved into engagement with the undersurfaces of body carried pin 87 to releasably retain the latch part in its holding condition. The key is then removed from the actuator, and the device is in its cocked active condition.

When the device is subjected to earthquake forces or other shock forces of a predetermined magnitude, those forces will result in swinging movement of pendulum 28 relative to the latch carried pin 78 by which it is carried, with resultant movement of the upper pin portion 84 of the pendulum laterally beyond the undersurface of pin 87, freeing the pendulum for upward movement at a side of pin 87 (broken lines in FIG. 5), far enough to permit latch part 27 to pivot to its broken line position of FIG. 5 and out of engagement with member 22, thereby releasing member 22 for rapid rotary movement under the influence of a spring 23 in a clockwise direction as viewed in FIG. 2 and through approximately 130° to the closed valve condition. The initial rotary movement of member 22 by spring 23 is not transmitted to element 25 and the valve, by virtue of the lost motion connection between the parts as discussed, but serves to enable development of adequate momentum in element 22 to assure closing of the valve when shoulders 55 of member 22 strike ears 50 of element 25 and commence to turn it and the valve. If the valve has become stuck, this striking force will be sufficient to break the stuck condition and assure closing of the valve.

While a certain specific embodiment of the present invention has been disclosed as typical, the invention is of course not limited to this particular form, but rather is applicable broadly to all such variations as fall within the scope of the appended claims.

I claim:

1. A shock responsive actuator for turning a stem of a valve or the like about an axis between first and second positions comprising:
   a body structure;
   a member mounted for rotary movement in opposite directions about said axis relative to said body structure and through a range of pivotal movement greater than that of said stem between said first and second positions thereof;
   spring means yieldingly urging said member in a first of said rotary directions relative to said body structure and resisting movement of said member in the opposite rotary direction;
   means forming a lost motion connection between said member and said stem for transmitting rotary movement about said axis from said member to said stem and enabling limited rotary movement of said member relative to said stem;
   latch means for releasably retaining said member against rotary movement in said first direction relative to said body structure and from a predetermined cocked position in which said stem is in said first position thereof; and
   inertia actuated weight means responsive to earthquake forces or other shock forces to release said latch means and permit spring induced rotary movement of said member in said first direction in a relation first turning said member through an angle relative to said stem and then turning said stem with said member from said first position to said second position of the stem.

2. A shock responsive actuator as recited in claim 1, in which said weight means include a pendulum suspended for swinging movement relative to said body structure and operable upon shock induced displacement relative to the body structure to release said latch means.

3. A shock responsive actuator as recited in claim 1, in which said inertia actuated weight means are carried movably by said latch means and displaceable relative thereto by shock forces.

4. A shock responsive actuator as recited in claim 1, in which said latch means includes a latch element mounted for pivotal movement relative to said body structure between active and released positions and operable in said active position to retain said member against movement relative to said body structure in said first direction, said weight means including a pendulum movably suspended by said latch element and operable to release said latch element upon shock induced movement of the pendulum.

5. A shock responsive actuator as recited in claim 1, in which said latch means include a latch element mounted for pivotal movement relative to said body structure between active and released positions and operable in said active position to retain said member against movement relative to said body structure in said first direction, said weight means including a pendulum movably suspended by said latch element and operable to release said latch element upon shock induced movement of the pendulum, said body structure and said pendulum having portions engaging one another in a relation retaining said latch element against movement to said released position, and displaceable relative to one another by shock induced movement of the pendulum and in a relation releasing said latch element for movement with the pendulum to said released position of the latch element.

6. A shock responsive actuator as recited in claim 1, in which said body structure extends essentially about and contains said inertia actuated weight means.

7. A shock responsive actuator as recited in claim 1, in which said member extends essentially about and contains said inertia actuated weight means.

8. A shock responsive actuator as recited in claim 1, in which said spring means include a coil spring extending essentially about and containing said inertia actuated weight means.

9. A shock responsive actuator as recited in claim 1, in which said body structure and said member and said spring means extend essentially about and contain said inertia actuated weight means.

10. A shock responsive actuator as recited in claim 9, in which said body structure and said member and said spring means extends essentially about said latch means.

11. A shock responsive actuator as recited in claim 1, in which said rotatively movable member extends essentially about said latch means.

12. A shock responsive actuator as recited in claim 1, in which said spring means include a coil spring extending essentially about said latch element.

13. A shock responsive actuator for turning a valve stem about a predetermined axis relative to a valve body, comprising:
   a mounting plate adapted to be attached to said valve body;
   a tubular part projecting from said mounting plate and extending essentially cylindrically about said axis;
   a member mounted rotatively about said tubular part and having an inner wall rotatably engaging said tubular part and an outer wall spaced radially outwardly from said tubular part and said inner wall to define a spring compartment extending essentially about said axis;

a coil spring within said compartment having opposite ends connected to said member and said tubular part respectively and yieldingly urging said member rotatively about said axis relative to said mounting plate and said tubular part and in a first rotary direction;

a valve actuating element interposed between said mounting plate and said member and connectible to said valve stem to turn it between first and second positions thereof;

said valve actuating element having shoulders engageable with coacting shoulders on said member in a relation providing a lost motion connection by which said member turns said valve actuating element and said stem in opposite directions rotatively about said axis but enabling limited rotary movement of said member relative to said valve actuating element;

a latch element contained within the interior of said tubular part and connected pivotally thereto for swinging movement between an active position engaging said member in a relation preventing rotary movement thereof in said first direction relative to said mounting plate and tubular member and a released position permitting such rotary movement of said member; and a pendulum suspended movably from said latch element and engageable with a projection carried by and located within said tubular part in a relation retaining said latch element in its active position and releasing the latch element upon shock induced displacement of the pendulum.

14. A shock responsive actuator as recited in claim 13, including stop shoulders on said valve actuating element and said mounting plate limiting pivotal movement of said element relative to said plate.

15. A shock responsive actuator as recited in claim 14, including a key having a worm portion insertable into a socket carried by said backing plate and engageable with worm gear teeth on said member in a relation to turn said member to a cocked position.

16. A shock responsive actuator as recited in claim 15, in which said latch element and said member have shoulders engageable to retain the member against movement in said first rotary direction and which are oriented to normally urge said element to a released position as a result of the rotary force exerted by said spring.

* * * * *